W. W. SMITH.
Felt Dental-Disk.
No. 225,884. Patented Mar. 23, 1880.
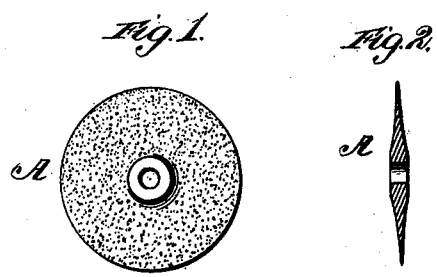
WITNESSES
Robert Everett,
Chas. G. Page.
INVENTOR
William W. Smith.
Gilmore, Smith & Co.
ATTORNEYS

UNITED STATES PATENT OFFICE.

WILLIAM W. SMITH, OF MONTROSE, PENNSYLVANIA.

FELT DENTAL DISK.

SPECIFICATION forming part of Letters Patent No. 225,884, dated March 23, 1880.

Application filed January 31, 1880.

*To all whom it may concern:*

Be it known that I, WILLIAM W. SMITH, of Montrose, in the county of Susquehanna and State of Pennsylvania, have invented certain new and useful Improvements in Felt Dental Disks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of my felt dental disks, and Fig. 2 is a vertical sectional view of the same.

The nature of my invention relates to an improvement in the manufacture of dental disks for cutting and polishing.

The broad idea of the manufacture and use of these dental disks is set forth in Patent No. 133,617, where it is proposed to make the abrading-disk of corundum.

According to my improvement, I make the abrading or grinding disk A of fur or wool felt, which is rendered rigid by being saturated with shellac varnish, and then either dried by artificial heat or allowed to dry in the open air. The aforesaid material, after being thus treated, is cut out with a punch to the required size, after which it is placed on a flat metal surface or in an oven previously heated sufficiently to melt the shellac, and while hot the disk is pressed between two flat surfaces. The disk is then turned in a lathe to the required shape and thickness. Finally, the disks thus prepared are washed in alcohol, after which they will be ready for use on the mandrel of a dental engine, any suitable polishing-powder being employed upon the disks for the purpose of polishing the teeth or the fillings therein.

The rough or felt-like surface of the disk will be peculiarly adapted for carrying polishing-powder. The strength and pliability of the disk eminently qualify the same for polishing the teeth or fillings, and the disk will be more agreeable to the patient than those heretofore employed, since it carries the polishing-powder evenly and does not produce the harsh grating sound during use which is incident to the employment of the ordinary grinding and abrading disk.

What I claim, and desire to secure by Letters Patent, is—

A dental cutting and polishing tool composed of a condensed felt disk saturated with varnish, substantially as set forth.

In testimony that I claim the above I have hereunto subscribed my name in the presence of two witnesses.

WILLIAM WALLACE SMITH.

Witnesses:
ALFRED BALDWIN,
D. D. LATHROP.